United States Patent
Kim et al.

(10) Patent No.: US 8,267,563 B2
(45) Date of Patent: Sep. 18, 2012

(54) BACKLIGHT UNIT HAVING A POINT LIGHT SOURCE AND DISPLAY APPARATUS HAVING THE SAME

(75) Inventors: JooYoung Kim, Cheonan-si (KR); Sung-Kyu Shim, Seoul (KR); Kwang-Wook Choi, Cheonan-si (KR); Hyoung-Joo Kim, Anyang-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 12/981,670

(22) Filed: Dec. 30, 2010

(65) Prior Publication Data

US 2011/0261587 A1    Oct. 27, 2011

(30) Foreign Application Priority Data

Apr. 26, 2010  (KR) .......................... 10-2010-0038638

(51) Int. Cl.
    *F21V 33/00*    (2006.01)
(52) U.S. Cl. .................. 362/613; 362/612; 362/628
(58) Field of Classification Search .................. 362/612, 362/613, 627, 628
    See application file for complete search history.

(56) References Cited

U.S. PATENT DOCUMENTS

| 2008/0316767 A1* | 12/2008 | Woo et al. ..................... 362/612 |
| 2010/0149802 A1* | 6/2010 | Chang ........................... 362/235 |

FOREIGN PATENT DOCUMENTS

| JP | 2005-251687 A | 9/2005 |
| KR | 10-2007-0044921 A | 5/2007 |
| KR | 10-2007-0065079 A | 6/2007 |

* cited by examiner

*Primary Examiner* — Laura Tso
(74) *Attorney, Agent, or Firm* — Cantor Colburn LLP

(57) ABSTRACT

A backlight unit includes; a plurality of point light sources, a light guide plate including lateral sides and main planes substantially perpendicular to the lateral sides, and a printed circuit board on which the point light sources are mounted. At least one side of the light guide plate includes a first plane, which does not correspond to the point light sources, and a light incident plane corresponding to the point light sources and having a predetermined inclination angle with respect to the first plane.

20 Claims, 3 Drawing Sheets

BACKLIGHT UNIT HAVING A POINT LIGHT SOURCE AND DISPLAY APPARATUS HAVING THE SAME

This application claims priority to Korean Patent Application No. 2010-38638, filed on Apr. 26, 2010, and all the benefits accruing therefrom under 35 U.S.C. §119, the content of which in its entirety is herein incorporated by reference.

BACKGROUND OF THE INVENTION

1. Field of the Invention

The present invention relates to a backlight unit and a display apparatus having the same. More particularly, the present invention relates to a backlight unit having a point light source and a display apparatus having the same.

2. Description of the Related Art

Recently, flat panel displays ("FPDs"), such as a liquid crystal display ("LCD"), has seen increasing market share because the FPD can be fabricated in a large size with a slim structure and a light weight. Since the LCD is a non-emissive display apparatus, an external light source, such as solar light or a backlight unit, is used to provide light for emission. In general, a backlight unit is disposed below a display apparatus to provide light to the display apparatus. The backlight unit may typically include a linear light source, such as a cold cathode fluorescent lamp ("CCFL"), a hot cathode fluorescent lamp ("HCFL"), or an external electrode florescent lamp ("EEFL") to provide white light to a display panel. The light emitted from the linear light source is typically reflected through a light guide plate and selectively output through a top surface of the light guide plate, so that the light is provided to the display panel.

As light source technologies have developed, the linear light source has been replaced with a point light source, such as a light emitting diode ("LED"). The LED has several advantageous as compared with the linear light source in terms of long life span, low power consumption, high quality color reproduction and small size.

However, many point light sources are typically required to achieve uniform brightness over the whole area of the display panel so that power consumption is increased while generating undesirable heat, thereby causing degradation of display quality.

BRIEF SUMMARY OF THE INVENTION

The present invention provides a backlight unit capable of providing light having uniform brightness using a small number of light sources and a display apparatus having the backlight unit.

The present invention also provides a backlight unit, in which a peripheral portion has a small width in a non-display region, and a display apparatus having the backlight unit.

The present invention provides a backlight unit capable of preventing degradation in display quality caused by light leakage and a display apparatus having the backlight unit.

In one exemplary embodiment, a backlight unit may include a plurality of point light sources to provide light, a light guide plate comprising a plurality of lateral sides and a plurality of main planes, and a printed circuit board on which the plurality of point light sources are mounted. At least one side of the light guide plate includes a first plane, which does not correspond to the plurality of point light sources, and a plurality of incident planes corresponding to the point light sources and having predetermined inclination angles with respect to the first plane. At least two incident planes may have different inclination angles from each other with respect to the first plane.

In one exemplary embodiment, the backlight unit may further include a reflective member which reflects the light emitted from the point light sources to supply the light to the main planes of the light guide plate, and the reflective member may not overlap the printed circuit board.

In one exemplary embodiment, the backlight unit may further include an auxiliary reflective member aligned with the printed circuit board and the reflective member to reduce leakage of the light emitted from the plurality of point light sources, and the auxiliary reflective member may be bonded to at least one of the printed circuit board and the reflective member.

In one exemplary embodiment, at least a part of the printed circuit board may overlap with the main plane of the light guide plate, and the printed circuit board may comprise a reflective layer having reflectance of greater than about 80% and disposed on a surface of the printed circuit board facing the light guide plate. The reflective layer of the printed circuit board may have a thickness substantially identical to a thickness of the reflective member to prevent the light leakage caused by delamination of the printed circuit board.

In one exemplary embodiment, the inclination angle of the incident plane with respect to the first plane is about 10° to about 70°.

In one exemplary embodiment, the incident planes may be symmetrically aligned about a line, which is substantially perpendicular to the first plane and extends substantially parallel to a center of the main planes of the light guide plate. In one exemplary embodiment, the incident planes can be asymmetrically aligned or can be aligned on only one side of the light guide plate about the center line extending through the center of the plurality of main planes of the light guide plate.

In one exemplary embodiment, the inclination angle of the incident planes may be reduced in a direction toward an end of the light guide plate in such a manner that incident light from the point light source disposed adjacent to the center of the main plane has an incident angle greater than that of incident light from the plurality of point light sources disposed adjacent to the end of the light guide plate.

In another exemplary embodiment, a display apparatus includes a display panel and a backlight unit which supplies light to the display panel. The backlight unit may include a plurality of point light sources which provide light, a light guide plate having a plurality of lateral sides and a plurality of main planes, a printed circuit board on which the point light sources are mounted, and a fixing unit which surrounds at least a part of the plurality of point light sources, the light guide plate and the printed circuit board. At least one side of the light guide plate may include a first plane, which does not correspond to the plurality of point light sources, and a plurality of incident planes corresponding to the plurality of point light sources and having predetermined inclination angles with respect to the first plane. At least two incident planes have inclination angles which are different from each other with respect to the first plane.

In one exemplary embodiment, the light guide plate may include a recess disposed in at least a part of the main plane, and the fixing unit may include a protrusion fitted into the recess of the light guide plate.

In still another exemplary embodiment, a display apparatus includes a display panel and a backlight unit supplying light to the display panel. The backlight unit may include a plurality of point light sources which provide light, a light guide plate comprising a plurality of lateral sides and a plurality of main planes, a printed circuit board on which the point light sources are mounted, a reflective member which reflects the light emitted from the point light sources to supply the light to the plurality of main planes of the light guide plate, and an auxiliary reflective member aligned with the printed circuit board and the reflective member to reduce leakage of the light emitted from the plurality of point light sources. At least one side of the light guide plate may include a plurality of incident planes corresponding to the plurality of point light sources to receive the light from the point light sources. The plurality of light incident planes are inclined with respect to the lateral sides of the light guide plate by a predetermined angle. At least two incident planes have inclination angles which are different from each other with respect to the lateral sides. At least a portion of the printed circuit board may overlap with the plurality of main planes of the light guide plate. A reflective layer may be disposed on a surface of the printed circuit board facing the light guide plate.

As described above, according to the exemplary embodiment of a backlight unit and the display apparatus having the same of the present invention, the uniform brightness can be achieved using a small number of point light sources while preventing the degradation in display quality caused by light leakage.

BRIEF DESCRIPTION OF THE DRAWINGS

The above and other advantages of the present invention will become readily apparent by reference to the following detailed description when considered in conjunction with the accompanying drawings wherein.

DETAILED DESCRIPTION OF THE INVENTION

Figure 1:
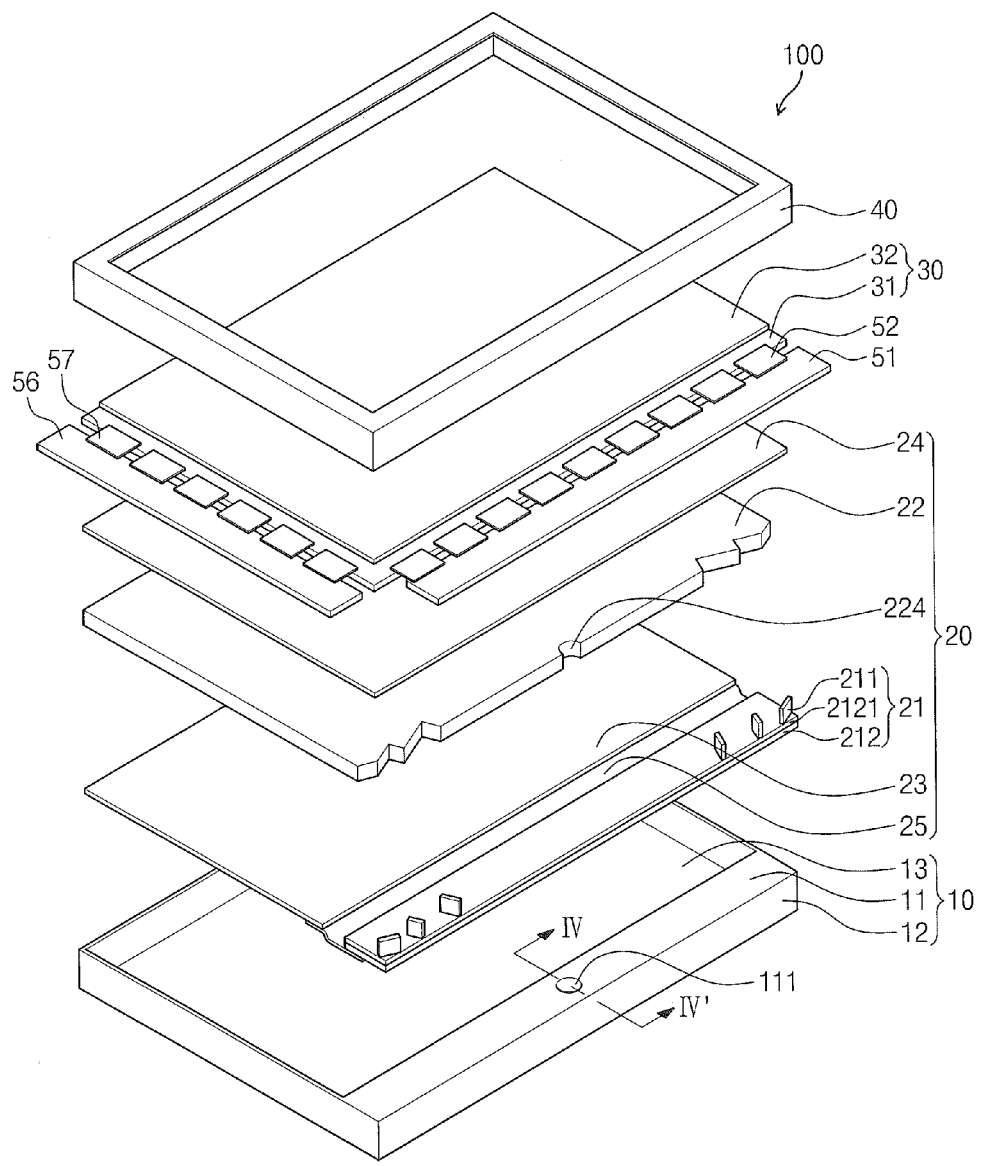
FIG. 1 is an exploded perspective view showing an exemplary embodiment of a display apparatus according to the present invention.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the present invention will be described in detail with reference to the accompanying drawings.

FIG. 1 is an exploded perspective view showing an exemplary embodiment of a display apparatus 100 according to the present invention.

Referring to FIG. 1, the display apparatus 100 includes a bottom chassis 10, a backlight unit 20, a display panel 30 and a top chassis 40.

The present exemplary embodiment of a backlight unit 20 may include a light source assembly 21, a light guide plate 22 that guides light by receiving the light from the light source assembly 21, a reflective plate 23 disposed below the light guide plate 22 to reflect the light emitted from the light source assembly 21 toward the display panel 30, and an optical sheet 24 disposed above the light guide plate 22 to improve characteristics of the light introduced from the light guide plate 22. Alternative exemplary embodiments include configurations wherein the optical sheet 24 may be omitted. In one exemplary embodiment, an auxiliary reflective member 25 may be provided below the light source assembly 21 and the reflective plate 23 to reduce leakage of light supplied from a light source 211 to an outside of the display apparatus 100. In one exemplary embodiment wherein it is included, the auxiliary reflective member 25 may be prepared in the form of an adhesive tape to facilitate the assembling work. In one exemplary embodiment, the auxiliary reflective member 25 may have a white or silver color, or a mirrored surface, wherein the auxiliary reflective member 25 has a reflectance of at least about 80%.

The light source assembly 21 includes the light source 211 that generates the light and a printed circuit board 212 on which the light source 211 is mounted. The printed circuit board 212 includes circuits printed thereon, wherein the circuits apply power to the light source 211. The light source 211 may include a point light source, such as a light emitting diode ("LED"). In addition, the light source 211 may include various combinations of white, red, green and blue LEDs. In the present exemplary embodiment, the light source assembly 21 is disposed at a lateral side of the light guide plate 22. The optical sheet 24 may include various combinations of a prism sheet, a diffusion sheet, a diffusion plate and a lens sheet, wherein any or all of the above may be omitted according to various exemplary embodiments.

The display panel 30 includes a first substrate 31 and a second substrate 32 opposite to the first substrate 31 to display an image by receiving the light from the backlight unit 20. The display panel 30 may include various non-emissive display apparatuses, such as an LCD panel or an electrophoretic display panel which displays the image by receiving and modifying the light from a separate light source. The display panel 30 and the backlight unit 20 are fixedly interposed between the bottom chassis 10 and the top chassis 40.

A driving circuit module is connected to the display panel 30. The driving circuit module may include a data-side printed circuit board ("PCB") 51 equipped with a control integrated circuit ("IC") (not shown) to apply a data signal to a data line (not shown) of the first substrate 31, a gate-side PCB 56 equipped with a control IC to apply a gate signal to a gate line (not shown) of the first substrate 31, a data-side flexible PCB 52 equipped with an exposed ground pattern (not shown) to interconnect the first substrate 31 and the data-side PCB 51, and a gate-side flexible PCB 57 equipped with an exposed ground pattern (not shown) to interconnect the first substrate 31 and the gate-side PCB 56. Alternative exemplary embodiments include alternative configurations of display driving circuitry.

The data-side PCB 51 and the gate-side PCB 56 are connected to the data-side flexible PCB 52 and the gate-side flexible PCB 57, respectively, to apply an external image signal and an external gate driving signal to the display panel 30. The data-side PCB 51 can be integrated with the gate-side PCB 56 as a single PCB such that the single PCB can be connected to one side of the display panel 30. To this end, the data line and the gate line of the first substrate 31 can be exposed to one side of the display panel 30.

The data-side flexible PCB 52 and the gate-side flexible PCB 57 are connected to the data line and the gate line of the first substrate 31, respectively, to apply the data driving signal and the data driving signal to a thin film transistor (not shown) within the display panel 30. In addition, the data-side flexible PCB 52 is equipped with a tab IC (not shown) to transmit signals to the display panel 30. In one exemplary embodiment, the data-side flexible PCB 52 transmits the image signal (which is typically an RGB signal including a red, green and blue image signal), a shift stack clock signal, a latch pulse signal, a gamma analog ground signal, a digital ground signal, digital power, analog power common voltage, and accumulation voltage, which are generated from the data-side PCB 51, to the display panel 30. The first substrate 31 can also be equipped with an IC.

Since the data-side PCB 51 and the gate-side PCB 56 can be integrated into the single PCB, the number of data-side flexible PCBs 52 and the gate-side flexible PCBs 57 used in the apparatus can be reduced. To this end, in at least one exemplary embodiment interconnections are directly formed on the first substrate 31 or a driving chip is mounted on the first substrate 31.

The bottom chassis 10 includes a bottom section 13, a top section 11, and sidewalls 12 extending substantially perpendicularly from the bottom section 13 to define a receiving space for the backlight unit 20 and the display panel 30. In addition, the top chassis 40 is coupled with the bottom chassis 10 to securely fix the backlight unit 20 and the display panel 30 in the bottom chassis 10.

In the present exemplary embodiment, the top section 11 of the bottom chassis 10 is provided with a protrusion 111, which protrudes toward the light guide plate 22. In addition, in the present exemplary embodiment a recess 224 is formed in the light guide plate 22 corresponding to the protrusion 111. Thus, the bottom chassis 10 can be fixedly coupled with the light guide plate 22 due to the protrusion 111 and the recess 224. The protrusion 111 can be formed on various positions of the bottom chassis 10 other than the top section 11 of the bottom chassis 10 or may be positioned on alternative locations on the bottom chassis.

Figure 2A:
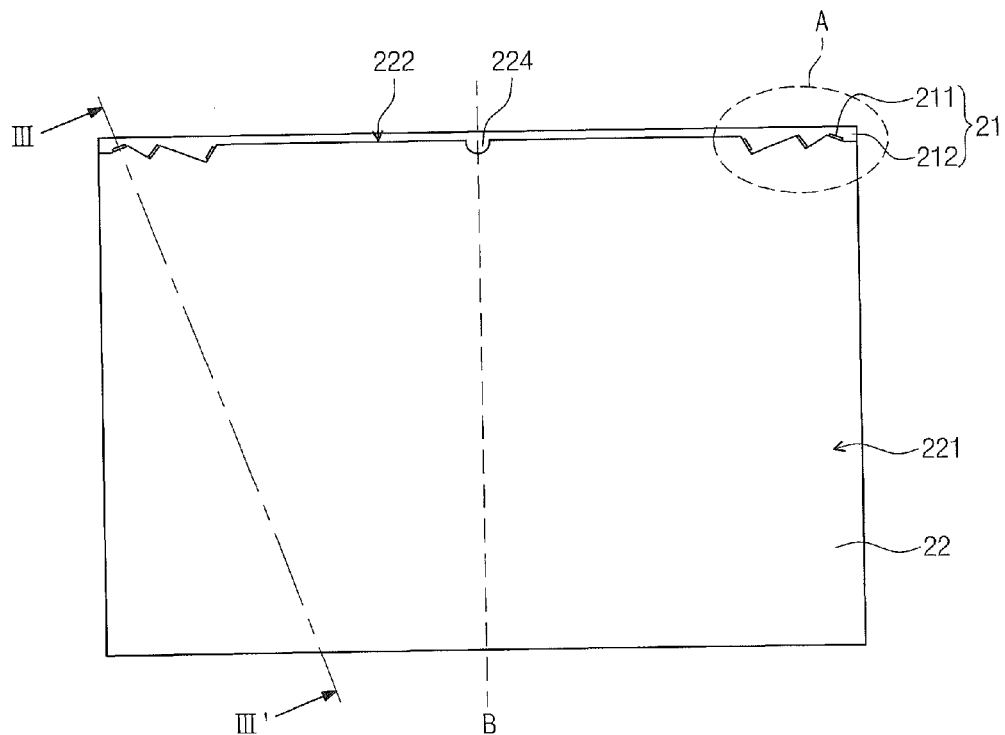
FIG. 2A is a top plan view showing an exemplary embodiment of a light guide plate and a light source assembly of the exemplary embodiment of a backlight unit shown in FIG. 1.
Figure 2B:
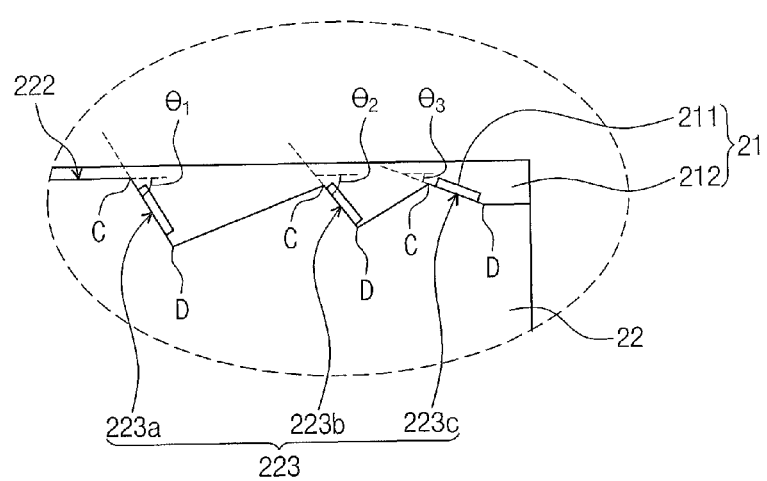
FIG. 2B is an enlarged view of the region "A" shown in FIG. 2A.

FIG. 2A is a top plan view showing the light guide plate 22 and the light source assembly 21 of the backlight unit 20 shown in FIG. 1, and FIG. 2B is an enlarged view of the region "A" shown in FIG. 2A.

Referring to FIGS. 2A and 2B, in the present exemplary embodiment the light source assembly 21 is disposed at one side of the light guide plate 22. Although not shown in the drawings, alternative exemplary embodiments include configurations wherein the light source assembly 21 may be disposed on at least two sides of the light guide plate 22. The light guide plate 22 includes two main planes 221, which are top and bottom surfaces of the light guide plate 22 corresponding to an image display region of the display panel 30

(see FIG. 1), and four lateral sides extending from, and substantially perpendicular to, the two main planes 221. The light guide plate 22 may have various structures, e.g., shapes, depending on the structure, e.g., shape, of the display panel 30. One side of the light guide plate 22 where the light source assembly 21 is disposed may include a first plane 222, which extends linearly in a region where the light source 211 is not disposed, and an incident plane 223, which corresponds to the light source 211 to receive the light from the light source 211. That is, the first plane 222 does not correspond to, e.g., is not aligned with, a light source 211, while the incident plane 223 does correspond to, e.g., is aligned with, a light source 211.

In one exemplary embodiment, a portion of the light guide plate 22 can be removed in a wedge shape such that the light source 211 can be installed on the light guide plate 22. In such an exemplary embodiment, the light source 211 can be installed inwardly of the peripheral portion of the light guide plate 22, e.g., the light source 211 may be disposed such that it is disposed on the same side of an imaginary line extending along a plane of the first plane 222 as the light guide plate 22, so that the width of the peripheral portion can be reduced in the non-display region of the display apparatus 100. In one exemplary embodiment, the portion of the light guide plate 22 corresponding to the light source 211 may have various shapes, such as a protrusion shape. In addition, exemplary embodiments of the incident plane 223 may have a linear shape or a curved shape. The incident plane 223 is inclined with respect to the first plane 222 by a predetermined angle $\theta 1$, $\theta 2$ or $\theta 3$. In such an exemplary embodiment, when compared with the comparative case where the light source 211 is aligned in line with the first plane 222, the number of the light sources 211 used can be reduced. According to the presented exemplary embodiments of the present invention, the inclination angle is defined as an angle between the first plane 222 and the incident plane 223 from the start point C and the end point D of the incident plane 223. The inclination angle may be determined by extending a line (an extension line) from the plane of the first plane 222 and measuring an angle between it and a line extending from the plane of the incident plane 223. In one exemplary embodiment, the incident plane 223 may be inclined with respect to the first plane 222 by an angle of about 0° to about 90°.

Referring to FIG. 2B, in the present exemplary embodiment the incident plane 223 may include a first incident plane 223a, a second incident plane 223b, and a third incident plane 223c. An acute angle formed between the extension line of the first incident plane 223a and the extension line of the first plane 222 is defined as a first acute angle $\theta 1$, an acute angle formed between the extension line of the second incident plane 223b and the extension line of the first plane 222 is defined as a second acute angle $\theta 2$, and an acute angle formed between the extension line of the third incident plane 223c and the extension line of the first plane 222 is defined as a third acute angle $\theta 3$.

The first to third incident planes 223a, 223b and 223c may be aligned in such a manner that the first acute angle $\theta 1$ is within a range of about 10° to about 20°, the second acute angle $\theta 2$ is within a range of about 34° to about 44°, and a third acute angle $\theta 3$ is within the range of about 60° to about 70°.

Although FIGS. 2A and 2B show three incident planes 223 formed at both sides, i.e. right and left portions, of the first plane 222 of the light guide plates 22, respectively, according to another exemplary embodiment of the present invention, only two incident planes 223 may be formed at both sides of the first plane 222 of the light guide plates 22, respectively. In addition, at least two of the three incident planes 223a, 223b and 223c may have the following inclination angles: $\theta 1 \approx \theta 2$, $\theta 2 \theta 3$, $\theta 1 \theta 3$ or $\theta 1 \theta 2 \theta 3$ (wherein $\theta 1$ is the first acute angle, $\theta 2$ is the second acute angle and $\theta 3$ is the third acute angle).

In addition, the inclination angles of the first to third incident planes 223a, 223b and 223c may be gradually reduced toward the end of the light guide plate 22 in order to supply sufficient light to the peripheral portion of the light guide plate 22.

In the present exemplary embodiment, The first to third incident planes 223a, 223b and 223c are symmetrically aligned about the center line B that extends through the lateral side of the light guide plate 22 where the light source assembly 21 is disposed and the center of the main planes 221 of the light guide plate 22, so that the light sources 211 are symmetrically disposed about the center line B. Alternative exemplary embodiments include configurations wherein the light source 211 and the incident plane 223 may be formed in various positions on the light guide plate 22 other than the end or the center of the light guide plate 22. In addition, in the alternative exemplary embodiments the light sources 211 and the incident planes 223 may be asymmetrically aligned about the center line B or may be aligned on only one side of the light guide plate 22.

Figure 3:
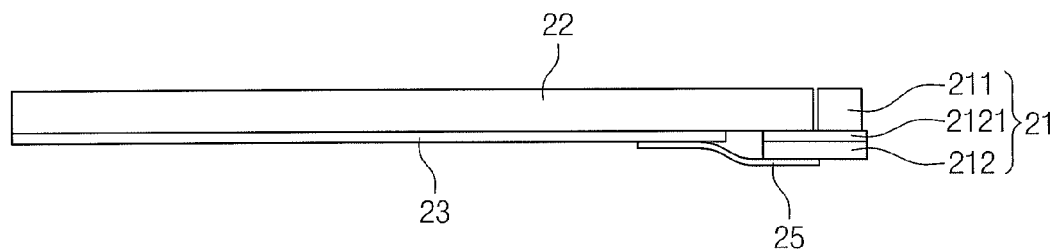
FIG. 3 is a cross-sectional view taken along line III-III' of FIG. 2A illustrating exemplary embodiments of a light guide plate, a light source assembly, a reflective plate and an auxiliary reflective member.

FIG. 3 is a cross-sectional view taken along line III-III' of FIG. 2A that illustrates the light guide plate 22, the light source assembly 21, the reflective plate 23 and the auxiliary reflective member 25.

Referring to FIG. 3, the reflective plate 23 aligned under the light guide plate 22 does not overlap with the printed circuit board 212. If the reflective plate 23 is overlapped with the printed circuit board 212, a gap may be formed between the light guide plate 22 and the printed circuit board 212, so that the light may be leaked through the gap to an outside. In order to improve light reflectance in the region where the reflective plate 23 is not disposed, a reflective layer 2121 may be formed on the printed circuit board 212. The reflective layer 2121 may have a white or silver color or a mirrored surface, wherein the reflective layer 2121 may have a reflectance of at least about 80%. In addition, the reflective layer 2121 has a thickness substantially identical to that of the reflective plate 23 to reduce the light leakage. Further, the auxiliary reflective member 25 may be provided below the reflective plate 23 and the printed circuit board 212 to reduce the light leakage to the outside. The auxiliary reflective member 25 is bonded to, or fixed to, at least one of the reflective plate 23 and the printed circuit board 212 to prevent the reflective plate 23 and the printed circuit board 212 from being separated, e.g., during the shipping or movement of the display device 100.

Figure 4:
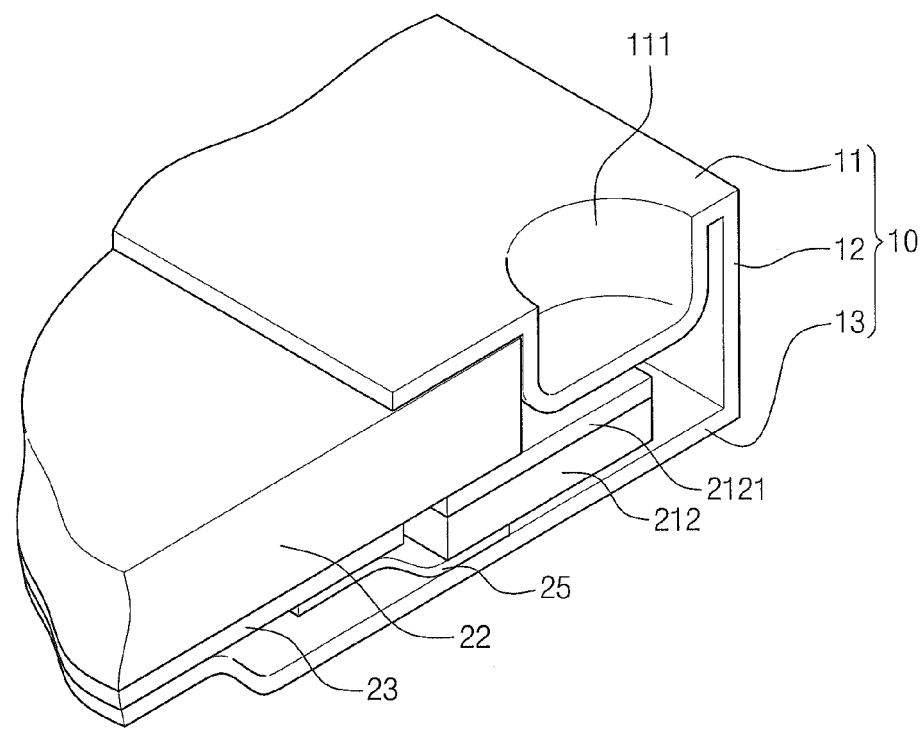
FIG. 4 is a cross-sectional view of an exemplary embodiment of a backlight unit taken along line IV-IV' of FIG. 1.

FIG. 4 is a cross-sectional view of the backlight unit 20 and the bottom chassis 10 taken along line IV-IV' of FIG. 1.

The bottom chassis 10 surrounds the reflective plate 23, the printed circuit board 212 of the light source assembly 21, the auxiliary reflective member 25, the light guide plate 22 and the optical sheet 24 such that they are fixedly installed in the bottom chassis 10. In addition, the protrusion 111 of the bottom chassis 10 is fitted into the recess 224 formed at one side of the light guide plate 22.

Referring to FIG. 4, in the present exemplary embodiment the protrusion 111 protrudes towards the light guide plate 22 from the top section 11 of the bottom chassis 10. However, according to another exemplary embodiment, the protrusion 111 may be formed to protrude from the bottom section 13 or the sidewall 12 of the bottom chassis 10. In addition, the position and shape of the recess 224 may vary depending on the position and the shape of the protrusion 111.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A backlight unit comprising:
a plurality of point light sources which emit a light;
a light guide plate comprising a plurality of lateral sides and a plurality of main planes disposed substantially perpendicular to the plurality of lateral sides; and
a printed circuit board on which the plurality of point light sources are mounted,
wherein at least one side of the light guide plate comprises a first plane, which does not correspond to the plurality of point light sources, and a plurality of incident planes corresponding to the plurality of point light sources and having predetermined inclination angles with respect to the first plane,
and wherein at least two incident planes have acute inclination angles which are different from each other with respect to the first plane.

2. The backlight unit of claim 1, further comprising a reflective member which reflects the light emitted from the plurality of point light sources and supplies the light to the plurality of main planes of the light guide plate, wherein the reflective member does not overlap the printed circuit board.

3. The backlight unit of claim 2, further comprising an auxiliary reflective member aligned with the printed circuit board and the reflective member, wherein the auxiliary reflective member reduces leakage of the light emitted from the plurality of point light sources to an outside, wherein the auxiliary reflective member is bonded to at least one of the printed circuit board and the reflective member.

4. The backlight unit of claim 2, wherein at least a portion of the printed circuit board overlaps with the plurality of main planes of the light guide plate, and the printed circuit board comprises a reflective layer having a reflectance of at least about 80%, wherein the reflective layer is disposed on a surface of the printed circuit board which faces the light guide plate.

5. The backlight unit of claim 4, wherein the reflective layer has a thickness substantially identical to a thickness of the reflective member.

6. The backlight unit of claim 1, wherein inclination angles of the incident planes is about 10° to about 70° with respect to the first plane.

7. The backlight unit of claim 1, wherein the plurality of incident planes are symmetrically aligned about a line which is substantially perpendicular to the first plane and extends substantially parallel to a central line of the plurality of main planes of the light guide plate.

8. The backlight unit of claim 1, wherein the inclination angles of the plurality of incident planes is reduced in a direction toward an end of the light guide plate.

9. A display apparatus comprising:
a display panel; and
a backlight unit which supplies light to the display panel, wherein the backlight unit comprises:
a plurality of point light sources which emit a light;
a light guide plate comprising a plurality of lateral sides and a plurality of main planes;
a printed circuit board on which the plurality of point light sources are mounted; and
a fixing unit which surrounds at least a portion of the plurality of point light sources, the light guide plate and the printed circuit board,
wherein at least one side of the light guide plate comprises a first plane, which does not correspond to the plurality of point light sources, and a plurality of incident planes corresponding to the plurality of point light sources and having predetermined inclination angles with respect to the first plane, and
wherein at least two incident planes have acute inclination angles which are different from each other with respect to the first plane.

10. The display apparatus of claim 9, wherein the backlight unit further comprises a reflective member which reflects the light emitted from the plurality of point light sources and supplies the light to the plurality of main planes of the light guide plate, and the reflective member does not overlap the printed circuit board.

11. The display apparatus of claim 10, wherein the backlight unit further comprises an auxiliary reflective member aligned with the printed circuit board and the reflective member, and wherein the auxiliary reflective member reduces leakage of the light emitted from the plurality of point light sources to an outside, and the auxiliary reflective member is bonded to at least one of the printed circuit board and the reflective member.

12. The display apparatus of claim 10, wherein at least a portion of the printed circuit board overlaps with the plurality of main planes of the light guide plate, and the printed circuit board comprises a reflective layer having a reflectance of at least about 80%, wherein the reflective layer is disposed on a surface of the printed circuit board which faces the light guide plate.

13. The display apparatus of claim 12, wherein the reflective layer of the printed circuit board has a thickness substantially identical to a thickness of the reflective member.

14. The display apparatus of claim 9, wherein the plurality of incident planes are symmetrically aligned about a line which is substantially perpendicular to the first plane and extends substantially parallel to a central line of the plurality of main planes of the light guide plate.

15. The display apparatus of claim 9, wherein the inclination angles of the plurality of incident planes is reduced in a direction toward an end of the light guide plate.

16. The display apparatus of claim 9, wherein the light guide plate comprises a recess disposed in at least a portion of the plurality of main planes, and the fixing unit comprises a protrusion which fits into the recess of the light guide plate.

17. A display apparatus comprising:
a display panel; and
a backlight unit which supplies light to the display panel, wherein the backlight unit comprises:
a plurality of point light sources which emit the light;
a light guide plate comprising a plurality of lateral sides and a plurality of main planes;
a printed circuit board on which the plurality of point light sources are mounted;
a reflective member which reflects the light emitted from the plurality of point light sources and supplies the light to the plurality of main planes of the light guide plate; and
an auxiliary reflective member aligned with the printed circuit board and the reflective member, wherein the auxiliary reflective member reduces leakage of the light emitted from the plurality of point light sources to an outside, wherein at least one lateral side of the light guide plate comprises a plurality of incident planes respectively corresponding to the plurality of point light sources to receive the light from the plurality of point light sources, wherein the plurality of incident planes are inclined with respect to the at least one lateral side of the light guide plate by a predetermined angle, wherein at least two incident planes have inclination angles which are different from each other with respect to the at least one lateral side, wherein at least a portion of the printed circuit board overlaps with the plurality of main planes of the light guide plate, and wherein a reflective layer is disposed on a surface of the printed circuit board which faces the light guide plate.

18. The display apparatus of claim 17, wherein the reflective member does not overlap the printed circuit board.

19. The display apparatus of claim 17, wherein the reflective layer has a thickness substantially identical to a thickness of the reflective member.

20. The display apparatus of claim 17, further comprising a fixing unit which surrounds at least a portion of the backlight unit, wherein the light guide plate comprises a recess disposed in at least a portion of the plurality of main planes, and the fixing unit comprises a protrusion which fits into the recess of the light guide plate.

* * * * *